(12) United States Patent
Ishikawa et al.

(10) Patent No.: US 9,352,424 B2
(45) Date of Patent: May 31, 2016

(54) BUTT WELDING JOINT USING HIGH-ENERGY DENSITY BEAM

(75) Inventors: Tadashi Ishikawa, Tokyo (JP); Ryuichi Honma, Tokyo (JP); Kazutoshi Ichikawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 13/512,732

(22) PCT Filed: Dec. 3, 2010

(86) PCT No.: PCT/JP2010/071721
§ 371 (c)(1),
(2), (4) Date: May 30, 2012

(87) PCT Pub. No.: WO2011/068216
PCT Pub. Date: Jun. 9, 2011

(65) Prior Publication Data
US 2012/0241420 A1  Sep. 27, 2012

(30) Foreign Application Priority Data
Dec. 4, 2009 (JP) .................................. 2009-277035

(51) Int. Cl.
*B23K 9/00* (2006.01)
*B23K 35/30* (2006.01)
(Continued)

(52) U.S. Cl.
CPC ............... *B23K 35/30* (2013.01); *B23K 15/006* (2013.01); *B23K 15/0073* (2013.01);
(Continued)

(58) Field of Classification Search
CPC ...... B23K 35/30; B23K 26/26; B23K 26/203; B23K 15/00; B23K 15/06; B23K 15/0073; B23K 15/006; B23K 2203/04; B23K 2201/18; B23K 2201/06; C22C 38/16; C22C 38/14; C22C 38/08; Y02E 10/728; F05B 2230/232; F03D 1/001
USPC .................................................... 219/121.13
See application file for complete search history.

(56) References Cited

U.S. PATENT DOCUMENTS 3,201,233 A * 8/1965 Hull ................................ 420/46
4,086,463 A * 4/1978 Omori et al. ............. 219/145.22
(Continued)

FOREIGN PATENT DOCUMENTS

EP  1108495  6/2001
EP  1340831  9/2003
(Continued)

OTHER PUBLICATIONS

Marquez, Differences Between 18-8, 304, and 316 Stainless Steel, Jun. 30, 2010, http://www.portlandbolt.com/faqs/18-8-304-and-316-stainless-steel/.*
(Continued)

*Primary Examiner* — Dana Ross
*Assistant Examiner* — Renee L Miller
(74) *Attorney, Agent, or Firm* — Kenyon & Kenyon LLP (57) ABSTRACT

A welding joint comprises a pair of steel materials, and a welding metal that is formed with a high-energy density beam at a butt welding portion between the pair of steel materials, wherein a transformation starting temperature Ms that is calculated by a following formula: $Ms(°C.)=371-353C-22Si-24.3Mn-7.7Cu-17.3Ni-17.7Cr-25.8Mo$, using a composition of mass % of the welding metal is 250° C. or less.

21 Claims, 2 Drawing Sheets

(51) Int. Cl.
*B23K 15/00* (2006.01)
*B23K 15/06* (2006.01)
*B23K 26/20* (2014.01)
*B23K 26/26* (2014.01)
*F03D 1/00* (2006.01)
*C22C 38/08* (2006.01)
*C22C 38/14* (2006.01)
*C22C 38/16* (2006.01)

(52) U.S. Cl.
CPC .............. *B23K 15/06* (2013.01); *B23K 26/203* (2013.01); *B23K 26/211* (2015.10); *B23K 26/26* (2013.01); *C22C 38/08* (2013.01); *C22C 38/14* (2013.01); *C22C 38/16* (2013.01); *F03D 1/001* (2013.01); *B23K 2201/06* (2013.01); *B23K 2201/18* (2013.01); *B23K 2203/04* (2013.01); *F05B 2230/232* (2013.01); *Y02E 10/728* (2013.01); *Y02P 70/523* (2015.11)

(56) References Cited

U.S. PATENT DOCUMENTS

| | | | | |
|---|---|---|---|---|
| 4,247,037 | A | * | 1/1981 | Tamai et al. ............ 228/203 |
| 4,436,554 | A | * | 3/1984 | Omae et al. ............ 148/332 |
| 4,683,014 | A | * | 7/1987 | Porowski et al. ........... 72/30.1 |
| 4,686,080 | A | * | 8/1987 | Hara et al. .................. 419/8 |
| 4,751,365 | A | * | 6/1988 | La Rocca et al. ...... 219/121.64 |
| 4,805,795 | A | * | 2/1989 | Sato et al. ................ 220/679 |
| 4,840,304 | A | * | 6/1989 | Sato et al. ................ 228/214 |
| 4,988,845 | A | * | 1/1991 | Bauer et al. ........... 219/121.63 |
| 5,182,428 | A | * | 1/1993 | Jack et al. ............. 219/121.64 |
| 5,201,458 | A | * | 4/1993 | Hagen .................... 228/199 |
| 5,266,770 | A | * | 11/1993 | Noe ...................... 219/121.63 |
| 5,601,736 | A | * | 2/1997 | Saitoh et al. .......... 219/121.64 |
| 5,628,449 | A | * | 5/1997 | Onuma et al. .......... 228/262.41 |
| 5,650,024 | A | * | 7/1997 | Hasegawa et al. ........ 148/326 |
| 5,744,782 | A | * | 4/1998 | Sampath et al. .......... 219/146.1 |
| 5,766,376 | A | * | 6/1998 | Hasegawa et al. ........ 148/328 |
| 5,879,480 | A | * | 3/1999 | Hetzner .................. 148/644 |
| 6,159,310 | A | * | 12/2000 | Inoue et al. ............ 148/325 |
| 6,220,306 | B1 | | 4/2001 | Omura et al. .............. 138/177 |
| 6,379,821 | B2 | * | 4/2002 | Kushida et al. .......... 428/685 |
| 6,919,534 | B2 | * | 7/2005 | Komai et al. ............ 219/137 R |
| 7,531,766 | B2 | * | 5/2009 | Wang et al. ............... 219/118 |
| 7,618,503 | B2 | * | 11/2009 | McCrink et al. ........ 148/663 |
| 2001/0030004 | A1 | * | 10/2001 | Kushida et al. ......... 148/325 |
| 2004/0185291 | A1 | * | 9/2004 | Cheng et al. ........... 428/615 |
| 2005/0121426 | A1 | * | 6/2005 | Wang et al. .......... 219/121.64 |
| 2006/0137777 | A1 | * | 6/2006 | Ishikawa et al. ........ 148/558 |
| 2006/0177689 | A1 | * | 8/2006 | Muir et al. ............... 428/684 |
| 2006/0201592 | A1 | * | 9/2006 | Ishikawa et al. ........ 148/593 |
| 2006/0243353 | A1 | * | 11/2006 | Milam .................... 148/524 |
| 2006/0243719 | A1 | * | 11/2006 | Inoue et al. ........... 219/146.41 |
| 2006/0289608 | A1 | * | 12/2006 | Steel et al. ................ 228/101 |
| 2007/0034607 | A1 | * | 2/2007 | Scott et al. ............... 219/61.5 |
| 2007/0181647 | A1 | * | 8/2007 | Ford et al. ............... 228/101 |
| 2007/0262063 | A1 | * | 11/2007 | Sano et al. ............ 219/121.85 |
| 2008/0032153 | A1 | * | 2/2008 | Vaughn et al. ........... 428/615 |
| 2008/0115863 | A1 | * | 5/2008 | McCrink et al. ......... 148/521 |
| 2008/0199346 | A1 | * | 8/2008 | Okazaki et al. .......... 420/106 |
| 2008/0302539 | A1 | * | 12/2008 | Mallenahalli et al. ...... 166/380 |
| 2009/0139969 | A1 | * | 6/2009 | Smith et al. .......... 219/121.64 |
| 2009/0188589 | A1 | * | 7/2009 | Okitsu .................... 148/504 |
| 2009/0261079 | A1 | * | 10/2009 | Gilles .................. 219/121.14 |
| 2009/0283504 | A1 | * | 11/2009 | Matsuo et al. ......... 219/121.64 |
| 2009/0302012 | A1 | * | 12/2009 | Ota et al. .............. 219/121.64 |
| 2010/0136369 | A1 | * | 6/2010 | Ayer et al. .............. 428/683 |
| 2010/0189592 | A1 | * | 7/2010 | Angles ................... 420/110 |
| 2012/0288324 | A1 | * | 11/2012 | Ishikawa et al. .......... 403/271 |

FOREIGN PATENT DOCUMENTS

| | | | | |
|---|---|---|---|---|
| EP | 1738858 A1 | * | 1/2007 | ............. B23K 26/06 |
| JP | 63-126683 | | 5/1988 | |
| JP | 03-248783 | | 11/1991 | |
| JP | 05123878 A | * | 5/1993 | ............. B23K 26/00 |
| JP | 05-148582 | | 6/1993 | |
| JP | 07-016763 | | 1/1995 | |
| JP | 2001-071176 | | 3/2001 | |
| JP | 2002-003984 | | 1/2002 | |
| JP | 2005-288504 | | 10/2005 | |
| JP | 2006-037397 | | 2/2006 | |
| JP | 2007-092406 | | 4/2007 | |
| JP | 2007-118025 | | 5/2007 | |
| JP | 2007-322400 | | 12/2007 | |
| JP | 2008-087034 | | 4/2008 | |
| JP | 2008-088504 | | 4/2008 | |
| JP | 2008-111406 | | 5/2008 | |
| WO | 99/16101 | | 4/1999 | |
| WO | WO 2008017341 A1 | * | 2/2008 | |
| WO | 2008/041372 | | 4/2008 | |

OTHER PUBLICATIONS

Kleiner et al, Structure and Properties of Low-Carbon Martensitic Steels, Aug. 1999, Metal Science and Heat Treatment, vol. 41, Nos. 7-8, 1999, 366-368.*
International Search Report dated Mar. 15, 2011, issued in corresponding PCT Application No. PCT/JP2010/071999.
Notice of Allowance dated Mar. 13, 2012, issued in corresponding Japanese application No. 2011-518622, with an English translation thereof.
European Search Report dated Mar. 11, 2013, issued in corresponding European Application No. 10834666.9.

* cited by examiner

BUTT WELDING JOINT USING HIGH-ENERGY DENSITY BEAM

FIELD OF THE INVENTION

The present invention relates to a welding joint which may perform butt welding by irradiating a pair of steel materials with a high-energy density beam, and more particularly, to a welding joint which may have excellent fatigue properties in a vibration environment of gigacycle range.

This application is a national stage application of International Application No. PCT/JP2010/071721, filed Dec. 3, 2010, which claims priority to Japanese Patent Application No. 2009-277035, filed Dec. 4, 2009, the content of which is incorporated herein by reference.

RELATED ART

In recent years, to reduce $CO_2$ gas causing global warming, or to cope with future depletion of fossil fuels such as petroleum, methods of using renewable natural energy have been actively attempted. Wind power is one of these, and large-scale wind power has been spread globally. Areas most suitable for wind power are areas where a strong wind can be expected to blow constant, therefore offshore wind power has been planned and realized on a global scale (see, Patent Documents 1 to 4).

In order to build a wind power generating tower at sea, it is necessary that a foundation portion of the tower be driven into the ground of the sea floor, and the foundation portion also has a sufficient length of at least the depth of water in which the foundation portion is placed. In addition, since it is necessary that the natural period of the entire wind power generating tower be optimized in a narrow range, a tube structure having a plate thickness of 50 mm or larger, for example, about 100 mm, and having a large section of which a diameter is about 4 m is adopted in the foundation portion of the wind power generating tower, therefore the entire height of the tower is equal to or larger than 80 m. There is a demand for welding and assembling such a large structure at the seaside near a construction site in a simple and highly efficient manner.

Therefore, as described above, there is a need for welding an extremely thick steel plate having a plate thickness reaching 100 mm in a highly efficient manner and on site, which does not exist in the related art.

In general, a high-energy density beam welding such as an electron beam welding, a laser beam welding, and the like is a welding method of effectively performing welding. However, particularly in the electron beam welding, it is necessary that the welding be performed while maintaining a high vacuum state in a vacuum chamber, therefore a size of a steel plate that can be welded is limited in the related art. In contrast, in recent years, as a welding method in which an extremely thick steel plate having a plate thickness about 100 mm can be efficiently welded on site, a welding method (RPEBW: Reduced Pressured Electron Beam Welding) in which construction is possible under a low vacuum has been developed in the British Welding Research Institute to be suggested (see, Patent Document 5).

By adopting the RPEBW method, it is expected that welding can be efficiently performed in a manner such that only a portion to be welded is in a local vacuum state even when welding a large structure such as the wind power generating tower.

However, on the other hand, in the RPEBW method, there arise new problems such as difficulties in securing the toughness of a molten metal portion (hereinafter, referred to as a "welding metal portion") which is welded by an electron beam, and then solidified so as to perform welding in a state in which the degree of vacuum is reduced, in comparison with the method of performing welding in the vacuum chamber.

To overcome the above described problems, in the related art, a method in which electron beam welding is performed by attaching an insert metal such as plate-shaped Ni and the like to a welding face, so that a Ni content of a welding metal is made to 0.1 to 4.5 mass % to thereby improve toughness such as a Charpy impact value of the welding metal, and the like has been suggested in Patent Documents 6 and 7.

The wind power generating tower on the sea is exposed to vibration caused by the constant blowing of strong wind as described above, so that a structure of the foundation portion continuously and repeatedly receives a load, and stress is continuously and repeatedly applied to a welding portion of the structure. Due to this, the welding portion of the structure requires fatigue resistant properties to vibration in the gigacycle range ($10^{9-10}$) having an order different from a typical fatigue cycle ($10^{6-7}$).

REFERENCE DOCUMENTS

Patent Documents

[Patent Document 1] Japanese Unexamined Patent Application, First Publication No. 2008-111406
[Patent Document 2] Japanese Unexamined Patent Application, First Publication No. 2007-092406
[Patent Document 3] Japanese Unexamined Patent Application, First Publication No. 2007-322400
[Patent Document 4] Japanese Unexamined Patent Application, First Publication No. 2006-037397
[Patent Document 5] Pamphlet of WO 99/16101
[Patent Document 6] Japanese Unexamined Patent Application, First Publication No. H3-248783
[Patent Document 7] Pamphlet of WO 08/041,372

SUMMARY OF THE INVENTION

Problems to be Solved by the Invention

In a high energy density welding in the related art, a meld metal of a welding portion is shrunk at the vicinity of room temperature of a final stage of welding, so that tensile residual stress is induced. There is a case in which fatigue strength is significantly reduced by the stress ratio effect. Due to this, with respect to vibration in the gigacycle range, there is a problem in that a fatigue crack is caused by tensile residual stress.

An object of the invention is to provide a welding joint having fatigue properties which can withstand against vibration in the gigacycle range, and having sufficient fracture toughness.

Methods for Solving the Problem

The invention has adopted the following means to achieve the object by solving the above problems.

That is, (1) a welding joint according to an aspect of the invention includes: a pair of steel materials; and a welding metal that is formed by a high-energy density beam at a butt welding portion between the pair of steel materials, wherein a transformation starting temperature Ms that is calculated by a following formula (a) using a composition in mass % of the welding metal is 250° C. or less.

$$Ms(°C.)=371-353C-22Si-24.3Mn-7.7Cu-17.3Ni-17.7Cr-25.8Mo \qquad (a)$$

(2) In the welding joint described in (1), it is preferable that the composition of the welding metal contains 0.5 to 4.0 mass % Ni and 0.5 to 6.0 mass % Cr.

(3) In the welding joint described in (2), it is preferable that the composition of the welding metal contains one or two of 0.1 to 2.0 mass % Mo and 0.1 to 5.0 mass % Cu, and contains Ni, Cr, Mo, and Cu by 1.1 to 10.0 mass % in total.

(4) In the welding joint described in (1), it is preferable that the composition of the welding metal contains 4.0 to 6.0 mass % Ni.

(5) In the welding joint described in (4), it is preferable that the composition of the welding metal contains one or two or more of 0.1 to 6.0 mass % Cr, 0.1 to 2.0 mass % Mo, and 0.1 to 5.0 mass % Cu, and contains Ni, Cr, Mo, and Cu by 4.1 to 10.0 mass % in total.

(6) In the welding joint described in (5), it is preferable that a hardenability index $D_I$ of the welding metal that is calculated by a following formula (b) using the composition of mass % of the welding metal is 0.1 to 3.0.

$$D_I=0.36C^{1/2}(1+0.7Si)(1+3.33Mn)(1+0.35Cu)(1+0.36Ni)(1+2.16Cr)(1+3Mo) \qquad (b)$$

(7) In the welding joint described in (1) to (5), it is preferable that the composition of the steel material contains 0.01 to 0.08 mass % C, 0.05 to 0.80 mass % Si, 0.8 to 2.5 mass % Mn, ≤0.03 mass % P, ≤0.02 mass % S, ≤0.008 mass % Al, 0.005 to 0.030 mass % Ti, and a balance consisting of iron and unavoidable impurities.

(8) In the welding joint described in (7), it is preferable that the composition of the steel material contains one or two or more of 0.1 to 1.0 mass % Cu, 0.1 to 6.0 mass % Ni, 0.1 to 1.0 mass % Cr, 0.1 to 0.5 mass % Mo, 0.01 to 0.08 mass % Nb, 0.01 to 0.10 mass % V, and 0.0005 to 0.0050 mass % B.

(9) In the welding joint described in (1) to (5), it is preferable that a thickness of the steel material is 30 mm to 200 mm.

(10) In the welding joint described in (1) to (5), it is preferable that the high-energy density beam is an electron beam.

Effects of the Invention

According to the above described welding joint, as the welding conditions of generating compressive residual stress rather than tensile residual stress in a welding portion at the time of welding using a high-energy density beam such as an electron beam, and the like, a condition capable of reducing a transformation starting temperature of a welding metal is selected. Due to this, since the compressive residual stress is applied to the welding portion after welding by expanding the welding metal at a low temperature, the fatigue properties improve.

In addition, when a butt welding joint is obtained in a manner such that welding is performed by irradiating a high-strength steel, in particular, a steel plate having a plate thickness of 30 mm or larger with a high-energy density beam, a welding joint having fatigue resistant properties in a vibration environment in the gigacycle range, and a sufficiently high fracture toughness value may be formed.

DETAILED DESCRIPTION OF THE INVENTION

A high-energy density beam welding joint 10 (hereinafter, referred to as a welding joint) according to an embodiment of the invention will be described with reference to FIG. 1B. The welding joint 10 is a welding using a high-energy density beam, and as the high-energy density beam, an electron beam is used in the present embodiment. Beyond the electron beam, a welding method (RPEBW: Reduced Pressured Electron Beam Welding) in which construction is possible under a low vacuum, or a laser beam welding may be used.

The welding joint 10 includes a pair of steel materials (welding base metal) 1, and a welding metal 4 that is welded by an electron beam to be formed at a butt welding portion 6 between the pair of steel materials 1. Here, a martensitic transformation starting temperature Ms (° C.) that is calculated by the following formula (a) using a composition (mass %) of the welding metal 4 is 250° C. or less.

$$Ms=371-353C-22Si-24.3Mn-7.7Cu-17.3Ni-17.7Cr-25.8Mo \qquad (a)$$

The inventors have found that the transformation starting temperature is overestimated in a formula estimating a martensitic transformation starting temperature which has been generally known because cooling velocity of the welding portion 6 in the welding joint 10 is large. Therefore, formula (a) is obtained by correcting a formula estimating a general transformation starting temperature.

In addition, it is desirable that a martensitic transformation finishing temperature (Mf (° C.)) is room temperature.

Further, in general, transformation that starts at 250° C. or less is a martensitic transformation. However, in the invention, it is unnecessary to ensure that the martensitic transformation starts exactly at 250° C. or less, and transformation which starts expanding in volume at 250° C. or less may be used. Thus, in the invention, the temperature calculated by the formula (a) may be simply at 250° C. or less. In addition, hereinafter, Ms is simply referred to as a transformation starting temperature.

Next, a high-energy density beam welding method used in the welding joint 10 will be described with reference to FIG. 1A.

Figure 1A:
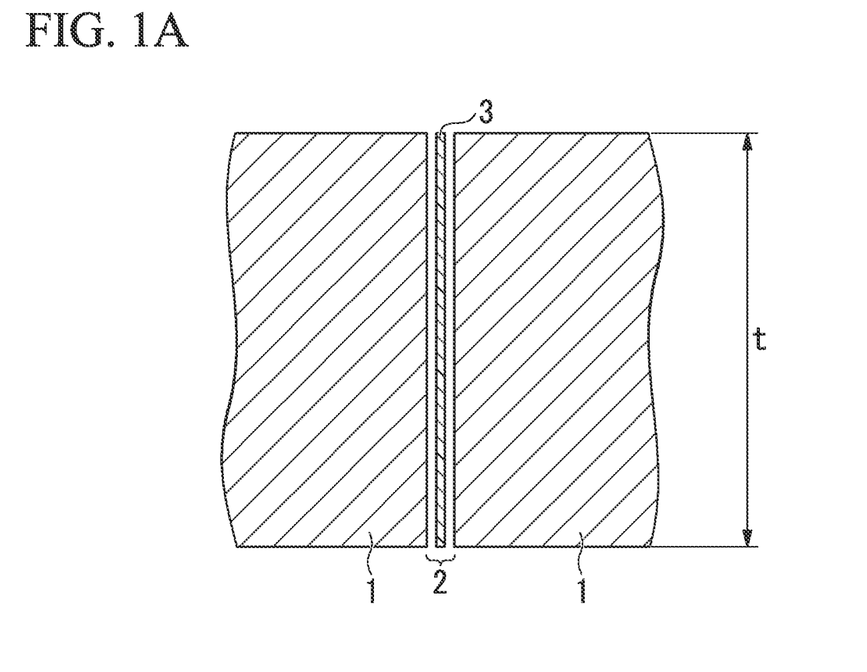
FIG. 1A is a cross-sectional view showing, in the thickness direction, a state of a butt welding joint before welding according to an embodiment of the invention.

In FIG. 1A, a schematic view of a welding method by the high-energy density beam is shown. As shown in FIG. 1A, an insert metal 3 is inserted to a groove 2 between the pair of steel materials 1, and the insert metal 3 and a surface of the groove 2 of the pair of steel materials 1 are welded using the high-energy density beam.

Figure 1B:
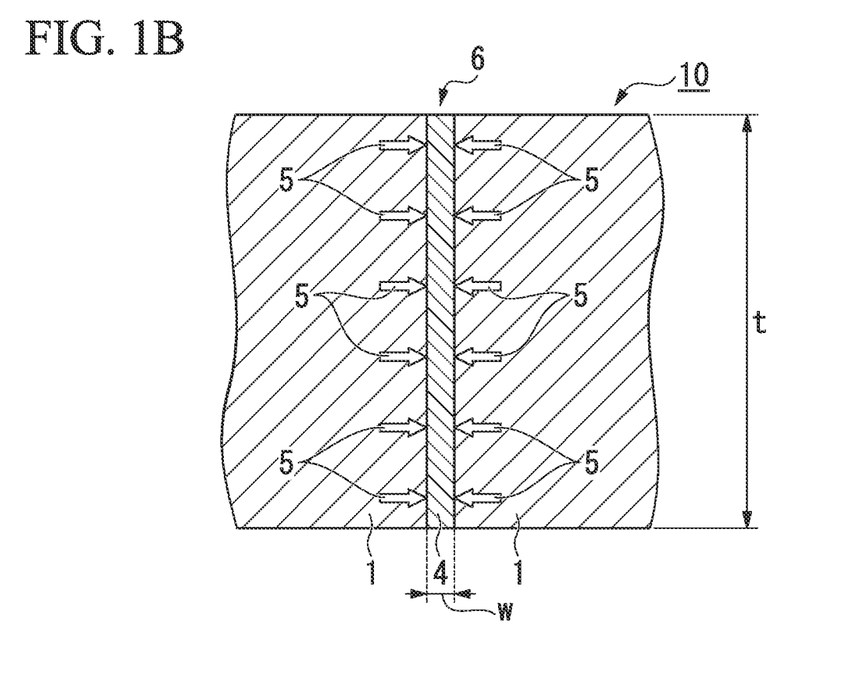
FIG. 1B is a cross-sectional view showing, in the thickness direction, a state of the butt welding joint after welding.

As shown in FIG. 1B, in a process in which the welding metal 4 formed in the welding portion 6 is solidified, and then the welding metal 4 is cooled to room temperature, transformation of the welding metal 4 starts at a relatively low temperature, that is, at 250° C. or less. In a state of holding compressive stress 5 generated in the welding portion 6, the compressive stress 5 is maintained up to room temperature by transformation expansion of the welding metal 4. Thus, fatigue strength of the welding joint 10 may be improved.

Here, when the transformation starting temperature is high, a volume expansion of the welding metal is not sufficiently restrained from a steel plate around the welding portion at the time of the transformation expansion of the welding metal, so that the compressive stress generated in the welding portion may be reduced. In this case, in a process in which the welding metal is transformed and expanded, and then the welding metal is cooled to room temperature, tensile stress is generated due to heat contraction. The transformation expansion is offset by the heat contraction, and thereby the welding metal formed in the welding portion is in a tensile residual stress state, and the fatigue strength is reduced.

From these reasons, in the present embodiment, the insert metal 3 is disposed in the groove 2 that is a butting portion of the pair of steel materials 1 when welding the pair of steel materials 1, so that the insert metal 3 and the pair of steel materials 1 that is the base metals are melted to form the welding joint 10 by the welding using the electron beam (high-energy density beam). To sufficiently achieve the improvement in the fatigue strength of the welding joint 10, it is necessary to secure a sufficient restraining force from the steel material 1 around the welding metal 4. Therefore, in the present embodiment, so that the transformation starting temperature Ms of the welding metal 4 formed in the welding portion 6 of the welding joint 10 becomes 250° C. or less, components of the insert metal 3 and the steel material are adjusted. In general, the width of the welding metal is predicted in advance from the welding conditions, and the like. Therefore, it is easily performable to adjust components of the welding metal to target components, that is, to adjust the transformation starting temperature Ms of the welding metal 4, based on components and dimensions of the insert metal 3, and components and dimensions of the steel material 1.

As described above, in the welding joint 10 according to the present embodiment, the transformation starting temperature is 250° C. or less, so that the welding metal 4 is transformed into martensite in a state of being restrained from the steel material 1. In this case, the welding metal 4 tends to expand, so that the welding metal 4 is in a state in which the compressive residual stress is imparted from the steel material 1. As a result, fatigue properties of the welding joint 10 are improved to a fatigue resistant strength which can withstand even in a vibration environment in the gigacycle range. In addition, to improve hardenability of the welding metal, the welding joint 10 which becomes a fine structure to have sufficient fracture toughness may be provided.

The steel material 1 used in the welding joint 10 according to the present embodiment is not particularly limited; however, it is preferable that a steel material having a plate thickness of 30 mm or larger or 50 mm or larger, where the above problem becomes noticeable, be used. In addition, it is preferable that an upper limit value of the plate thickness be 120 mm or 200 mm. A pair of steel materials is used; however, the pair of steel materials does not necessarily have the same plate thickness, components, and the like.

In addition, a composition of the steel plate 1 used in the welding joint 10 according to the present embodiment may be adjusted by a composition and combination of the insert metal 3 to be used, so that the transformation starting temperature of the welding metal 4 to be formed becomes 250° C. or less. The steel material 1 to be used is not particularly limited; however, it is preferable that the steel material 1 be a steel material in which C is restricted to 0.2 mass % or less, and in which the yield strength is 355 MPa or larger. The tensile strength may be limited to 690 MPa or less, or 780 MPa or less. As such a high-strength steel plate, a steel plate manufactured from a structural steel for welding which has a known component composition may be used.

In addition, the composition of the steel material 1 is not particularly limited; however, it is preferable that the composition of the steel material 1 contains, by mass %, 0.01 to 0.08% C, 0.05 to 0.80% Si, 0.8 to 2.5% Mn, ≤0.03% P, ≤0.02% S, ≤0.008% Al, 0.005 to 0.030% Ti, and the balance consisting of iron and unavoidable impurities. The composition is used as a basic component, and a steel containing one or two kinds of Cr, Mo, Ni, Cu, W, Co, V, Nb, Ti, Zr, Ta, Hf, REM, Y, Ca, Mg, Te, Se, and B in accordance with required properties such as improvement in a strength or joint toughness of the base metal (steel material 1), and the like by 8% or less in total may be used. As a specific example, it is preferable that the composition of the steel contain, by mass, one or two kinds of 0.1 to 1.0% Cu, 0.1 to 6.0% Ni, 0.1 to 1.0% Cr, 0.1 to 0.6% Mo, 0.01 to 0.08% Nb, 0.01 to 0.10% V, and 0.0005 to 0.0050% B. Meanwhile, when the steel material 1 contains such alloy components, the price of the steel material becomes very expensive. In practice, when performing welding using an insert material containing expansive alloy components, a much cheaper welding joint may be obtained. For this reason, the above described alloy components may be limited. For example, the steel containing one or two kinds of Ni, Cr, Mo, and Cu by 4% or less in total, by 2% or less in total, or by 1% or less in total may be used. In addition, the steel containing one or two kinds of Cr, Mo, Ni, Cu, W, Co, V, Nb, Ti, Zr, Ta, Hf, REM, Y, Ca, Mg, Te, Se, and B by 4% or less in total, or by 2% in total may be used.

Hereinafter, the need for component limitation in the steel material 1 will be described. Also, in the following descriptions, % indicates mass %.

To obtain sufficient strength as a steel for structure, it is preferable that the amount of C contained in the steel material 1 be 0.01% or larger. The amount of C contained in the steel material 1 may be limited to 0.02% or larger or 0.03% or larger, if necessary. To prevent a reduction of toughness due to abnormal hardening of the welding metal 4, the amount of C may be limited to 0.12% or less. The amount of C contained in the steel material 1 may be limited to 0.08% or less, or 0.06% or less, if necessary.

To obtain excellent toughness in the welding metal 4, it is preferable that the amount of Si contained in the steel material 1 be 0.80% or less. The amount of Si contained in the steel material 1 may be limited to 0.50% or less, 0.30% or less, or 0.15% or less, if necessary. The lower limit of the Si content is not particularly required to be determined; however, it is preferable that the Si content be 0.05% or larger so as to perform an appropriate deoxidizing treatment. The Si content may be limited to 0.08% or larger, if necessary.

Mn is an inexpensive element having a large effect in optimizing a microstructure. To secure a required strength and toughness as the steel for structure, it is preferable that an amount of Mn of 0.8 to 2.5% be added to the steel material 1. To prevent the abnormal hardening of the welding metal 4, the upper limit of the amount of Mn contained in the steel material 1 may be limited to 2.3%, 2.0%, or 1.9%.

P and S are unavoidable impurities. However, since they deteriorate toughness, and the like, it is preferable that P and S be respectively limited to 0.03% or less, and 0.02% or less. To improve the toughness, it is preferably lower, and the upper limit of the amount of P contained in the steel material 1 may be limited to 0.02%, 0.015%, or 0.010%, and the upper limit of the amount of S may be limited to 0.015%, 0.010%, or 0.006%.

To enhance the toughness of the welding metal 4, it is preferable that the Al content of the steel material 1 be 0.008% or less. To improve the toughness, the upper limit of the Al content may be limited to 0.006%, 0.005%, or 0.003%.

To enhance the toughness of the welding metal 4, it is preferable that Ti oxide having an appropriate amount be generated. Due to this, it is preferable that the amount of Ti contained in the steel material 1 be 0.005 to 0.030%. The upper limit of the Ti content may be limited to 0.025%, 0.020%, or 0.015%, if necessary. In addition, the lower limit of the Ti content may be limited to 0.007%, or 0.009%.

Cu is an element that improves the strength or toughness of the steel material 1, and may be added, if necessary. To improve the strength or the toughness, Cu of 0.1% or larger or 0.3% or larger may be added. Meanwhile, to prevent flaws or the like in the steel material 1 due to addition of a large amount of Cu, it is preferable that the upper limit of the Cu content be 1.0%. The upper limit of the Cu content may be limited to 0.7% or 0.5%, if necessary.

Ni is an element that is effective for improving the toughness of the steel material 1 and the welding metal 4, and an amount of Ni of 0.1% or larger may be added to the steel material 1. Meanwhile, Ni is expensive, and therefore it is preferable that the amount of Ni be 6.0% or less. To reduce the price of the steel material 1, the upper limit of the Ni content may be limited to 2.0%, 1.0%, or 0.5%.

Mo is an element that is effective for improving strength, and an amount of Mo of 0.1% or larger may be added to the steel material 1, if necessary. The welding metal 4 is abnormally hardened when a large amount of Mo is added resulting in a reduction in the toughness. Therefore, it is preferable that the amount of Mo be 0.6% or less. The amount of Mo contained in the steel material 1 may be limited to 0.2% or less, or 0.15% or less, if necessary.

Nb is an element that is effective for improving the strength or toughness of the steel material 1, and the amount of Nb of 0.01% or larger may be added to the steel material 1, if necessary. The toughness of the welding metal 4 is reduced when a large amount of Nb is added, therefore it is preferable that the Nb content be 0.08% or less. The Nb content may be limited to 0.05% or less or 0.03% or less, if necessary.

V is an element that is effective for improving the strength of the steel material 1, and an amount of V of 0.01% or larger may be added, if necessary. The toughness of the welding metal 4 is reduced when a large amount of V is added, therefore it is preferable that the V content be 0.10% or less. The V content may be limited to 0.07% or less, or 0.04% or less, if necessary.

B is an element that is effective for improving the strength of the steel material 1, and an amount of B of 0.0005% or larger may be added to the steel material 1, if necessary. The toughness of the welding metal 4 is reduced when a large amount of B is added, therefore it is preferable that the B content be 0.0050% or less. The B content may be limited to 0.0020% or less, or 0.0015% or less, if necessary.

Ca and REM are elements that are effective for improving lamellar tear resistant properties, and an amount of Ca and REM of 0.0005% or larger may be added to the steel material 1, if necessary. The toughness of the steel material 1 is reduced when a large amount of Ca and REM is added, therefore it is preferable that the Ca and REM content may be 0.0050% or less.

Mg is an element that is effective for improving toughness of a weld heat-affected zone of the steel material 1, and an amount of Mg of 0.0003% or larger may be added. The toughness of the steel material is reduced when a large amount of Mg is added, therefore it is preferable that the Mg content be 0.0050% or less.

It is preferable that the composition of the welding metal 4 contain 0.5 to 4.0% Ni and 0.5 to 6.0% Cr. Due to this, the transformation starting temperature Ms easily becomes 250° C. or less. In addition, by suppressing the Ni content which is expensive, the welding joint 10 of which the fatigue strength is improved by low costs may be obtained. In this case, it is preferable that the composition of the steel contain, by mass, one or two kinds of 0.1 to 2.0% Mo, and 0.1 to 5.0% Cu, and contain Ni, Cr, Mo, and Cu by 1.1 to 10.0% in total. In this manner, by enabling the steel to contain one or two kinds of Mo and Cu, the fatigue strength is improved, thereby obtaining sufficient fracture toughness.

Alternatively, the composition of the welding metal 4 may contain, for example, 4.0 to 6.0% Ni, other than the above described composition. In this case, the Ni content is increased, thereby improving the toughness. In this case, it is preferable that the composition of the steel contain, by mass, one or two kinds of 0.1 to 6.0% Cr, 0.1 to 2.0% Mo, and 0.1 to 5.0% Cu, and contain Ni, Cr, Mo, and Cu by 4.1 to 10.0% in total. In this manner, by enabling the composition of the steel to contain one or two kinds of Mo and Cu, the fatigue strength is improved, thereby obtaining sufficient fracture toughness.

Ni is an element that is effective for improving the fatigue strength of the welding joint 10 by reducing the transformation starting temperature Ms of the welding metal 4. In addition, Ni is an element that improves joint properties such as the strength, toughness, and the like. It is preferable that the lower limit of the Ni content in a case in which the welding metal contains Ni be 0.5% as a minimum value at which sufficient improvement effect in the fatigue strength can be expected. To reliably improve the fatigue strength, it is more preferable that the lower limit of the Ni content be 1.0% or 2.0%. In addition, when the Ni content of the welding metal exceeds 6.0%, cooling may be terminated while austenite remains without performing transformation into bainite or martensite in which the welding material 4 is transformed at a lower temperature, so that the improvement of the fatigue strength cannot be expected. Thus, it is preferable that the upper limit of the Ni content be 6.0%.

Cr and Mo are elements that secure hardenability by reducing the transformation starting temperature Ms of the welding metal 4 to improve the strength. In particular, Cr and Mo have higher effects in improving the strength of the welding metal 4 and securing the hardenability thereof in comparison with Ni. So that the fatigue strength of the welding joint 10 is further improved by transforming, using these effects, the welding metal 4 into a structure in which a transformation temperature such as martensite or the like is low, it is preferable that the Cr and Mo content be 0.1% or larger. Meanwhile, Cr and Mo have low effects in improving the toughness of the welding metal 4 in comparison with Ni, so that the toughness of the welding metal 4 may be reduced when a large amount of Cr and Mo is added. Thus, it is preferable that the upper limit of the Cr content be 6.0%, and the upper limit of the Mo content be 2.0%.

In addition, when the Ni content is 4.0% or less, the Cr content of 0.5% or larger is required so as to enable the transformation starting temperature Ms of the welding metal 4 to reliably become 250° C. or less. When the Ni content is 2.0% or less, the lower limit of the Cr content may be limited to 1.5% or 2%, and when the Ni content is 1.0% or less, the lower limit of the Cr content may be limited to 2.0% or 2.5%. To avoid a reduction in the toughness of the welding metal 4, the lower limit of the Cr content may be limited to 4.0% or 3.0%. For the same reason, the lower limit of the Mo content may be limited to 1%, 0.5%, or 0.2%. Even when the Ni content exceeds 4.0%, the lower limit of the Cr content may be limited to 0.5%, if necessary.

Cu is also an element that is effective for reducing the transformation starting temperature Ms of the welding metal 4, improving the strength, and securing the hardenability, similar to Cr and Mo. To obtain effects such as reducing the transformation starting temperature Ms, improving the strength, and securing the hardenability, it is preferable that the lower limit of the Cu content be 0.1%. However, when Cu is excessively added in the welding metal, Cu cracking may be generated in the welding metal, so that it is preferable that the upper limit of the Cu content be 5.0%. More preferably, the upper limit of the Cu content is 0.3%.

The welding metal 4 of the invention may contain component elements in the following containing range for the following purposes.

B is an element that significantly improves hardenability, and enables the microstructure of the welding metal 4 to have a higher strength by securing the hardenability of the welding metal 4. In addition, B suppresses generation of a structure in which transformation starts at a high temperature, so that the structure becomes a microstructure in which transformation is performed at a lower temperature. In general, since the welding metal 4 has large oxygen content in comparison with the steel material 1, B is bonded with oxygen, the above described effects may be reduced. However, in the RPEB welding that is a target of the present embodiment, the amount of oxygen or nitrogen is extremely low, therefore the lower limit of the B content of 0.0003% is sufficient so as to improve the hardenability due to B among the welding metals, and improve tensile strength and fatigue strength due to a control of the microstructure. Meanwhile, effects by B addition are not significantly increased even when an amount of B exceeding 0.0003% is added, so that it is preferable that the upper limit of the amount of the added B be 0.005%.

All of Nb, V, and Ti are elements that form a carbide in the welding metal 4 to increase strength, and the welding metal 4 contains one or two kinds of Nb, V, and Ti by a small amount, thereby improving joint strength. When the lower limit of the total Nb, V, and Ti content of one or two kinds of is less than 0.005%, improvement in the joint strength may not be significantly expected, so that it is preferable that the lower limit of the total content be 0.005%. Meanwhile, when the total content exceeds 0.3%, the strength of the welding metal 4 is excessively increased resulting in causing problems due to joint properties, therefore it is preferable that the upper limit of the total content be 0.3%. In addition, Ti may stabilize a welding arc in addition to the effect of improving the strength of the welding metal 4, therefore it is preferable that the lower limit of the Ti content be 0.003% when Ti is contained. In addition, to improve the toughness of the welding metal 4, the lower limit of the Al content may be limited to 0.003%, 0.005%, or 0.008%.

An electron beam welding, and the like, may be performed using the insert metal 3 so as to enable the composition of the welding metal 4 to be the same as that of the above. Since a bead width, that is, the width of the welding metal 4 may be highly accurately estimated from the welding conditions, components and a thickness of the insert metal 3 may be selected so as to be components of the welding metal 4 which is a target. For example, as the insert metal 3, a metal foil containing one or two kinds of pure Ni or 1 to 10% Ni, 0.1 to 2.0% Cr, 0.1 to 2.0% Mo, and 0.1 to 5.0% Cu by 0.5 to 10.0% in total may be used.

In the present embodiment, it is preferable that the hardness of the welding metal 4 be within 140% of the hardness of the steel material 1 which is the base metal. It is preferable that the welding metal 4 be subjected to martensite structurization so that the amount of expansion at the time of transformation of the welding metal 4 may be utilized in room temperature by reducing the transformation starting temperature Ms. However, when the structure of the welding metal 4 is too hard, a reduction in the fraction toughness value δc due to an increase in local stress may be caused, so that it is preferable that the hardness of the welding metal 4 be suppressed to 140% or less.

By satisfying conditions in which the composition of the welding metal 4 contains one or two kinds of 0.5 to 6.0% Ni, 0.1 to 6.0% Cr, 0.1 to 2.0% Mo, and 0.1 to 5.0% Cu by 0.5 to 10.0% in total, and preferably, contains by 1.1 to 10.0%, it is preferable that a balance between the components with the welding metal 4 formed using the steel material 1 being the base material and the insert metal 3 be appropriately adjusted, or a cooling rate after welding be adjusted. Thus, the hardness of the welding metal 4 may be prevented from being too high, so that the hardness difference between the welding metal 4 and the steel material 1 (the hardness of the welding metal 4 is within 140% of the hardness of the steel material 1) may be adjusted.

In addition, to reliably reduce the transformation starting temperature Ms of the welding metal 4, the total Ni, Cr, Mo, and Cu content in the welding metal 4 may be limited to 0.5% or larger, 1.0%, 2.0%, or 3.0% or larger.

In addition, to improve the toughness of the welding metal 4 by preventing abnormal hardening of the welding metal 4, it is preferable that the hardenability index $D_I$ of the welding metal 4 that is calculated by the following formula (b) using the composition of the welding metal 4 be 0.1 to 3.0.

$$D_I = 0.36C^{1/2}(1+0.7Si)(1+3.33Mn)(1+0.35Cu)(1+0.36Ni)(1+2.16Cr)(1+3Mo) \quad (b)$$

When the hardenability index $D_I$ of the welding metal 4 exceeds 3.0, the hardness of the welding metal is increased and resulting in a reduction in the toughness, therefore it is preferable that the hardenability index $D_I$ be 3.0 or less. The upper limit of the hardenability index $D_I$ may be limited to 1.2, 0.9, or 0.7, if necessary. Meanwhile, when the hardenability index $D_I$ is too low, the welding metal 4 is not subjected to martensite structurization, therefore it is preferable that the hardenability index $D_I$ be 0.1 or larger. Therefore the welding metal 4 is reliably subjected to martensite structurization, the lower limit of the hardenability index $D_I$ may be limited to 0.2 or larger, 0.25 or larger, or 0.3 or larger.

In the present embodiment, the condition of the welding using the high-energy density beam is not particularly limited; however, for example, in the case of the electron beam welding, welding is performed under conditions such as a voltage of 175V, a current of 120 mA, a welding speed of 125 mm/min, and the like when the plate thickness of 80 mm is used. In addition, the electron beam welding is performed under a high vacuum, typically, less than or equal to 10 to 3 mbar; however, the present embodiment may be applied even to a welding joint which is performed under a low vacuum degree such as in the above described RPEBW method, for example, under a vacuum of about 1 mbar.

In addition, as an irradiation region of the electron beam is increased at the time of electron beam welding, a input heat amount applied to the steel material 1 is excessively large, and a structure of an FL unit (Fusion Line, a boundary unit between the steel material 1 and the welding metal 4) is coarsened, therefore it is not preferable when stabilizing and ensuring fracture toughness value δc of the FL unit.

In addition, when the welding joint 10 is manufactured using RPEBW welding, the width of the welding metal tends to be increased in comparison with a welding joint manufactured by the electron beam welding (EBW welding) in a high vacuum state within a vacuum chamber.

Due to this, in the present embodiment, even in the case of using the RPEBW welding, it is preferable that a width w of the welding metal 4 shown in FIG. 1B be 20% or less or 10% or less of the plate thickness t of the steel material 1, which is the base material, so as to stabilize and ensure the fracture toughness value δc of the welding joint 10.

In the present embodiment, the electron beam as the high-energy density beam is used so as to be suitable for local rapid heating and rapid cooling of the welding portion 6; however, the invention is not limited thereto.

Next, the invention will be described based on an example; however, conditions in the example is a first condition example adopted so as to verify feasibility and effectiveness of the invention, and the invention is not limited to the first condition example. That is, the invention may adopt a variety of conditions or a combination of conditions as long as the conditions or the combination may achieve the purpose of the invention without departing from the gist of the invention.

EXAMPLES

The insert metal having components shown in Table 2 was inserted using the steel materials 1 to 20 having a chemical composition shown in Table 1, and was subjected to butt welding using the electron beam welding and the laser beam welding under the welding conditions shown in Table 3 to thereby form a welding joint.

As described above, a transformation starting temperature Ms (° C.) shown in Table was obtained using a formula of Ms=371−353C−22Si−24.3Mn−7.7Cu−17.3Ni−17.7Cr−25.8Mo.

Figure 2:
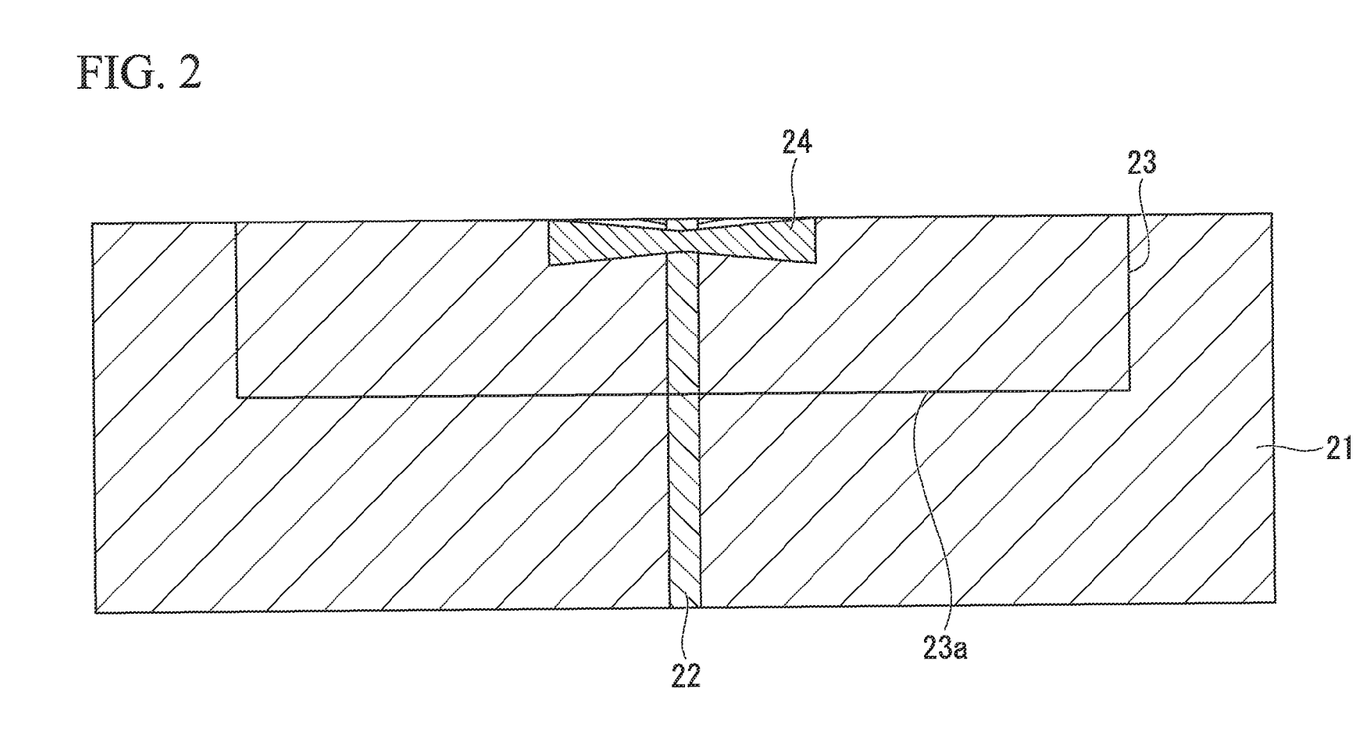
FIG. 2 is a view showing a sampling position of a fatigue test piece of the butt welding joint.

In the welding joint shown in FIG. 2, it was devised that a joint fatigue test piece 23 was sampled, and a rear surface 23a of the joint fatigue test piece 23 was subjected to mechanical grinding, so that a fatigue crack was generated from a surface side of the test piece. A fatigue test was conducted at an axial force, a stress ratio of 0.1, and a repetition rate of 5 Hz, thereby calculating a fatigue strength at $2 \times 10^6$ cycles. In addition, in the welding joint shown in FIG. 2, an ultrasonic test piece 24 was sampled, a fatigue strength at $2 \times 10^6$ cycles and a fatigue strength in a gigacycle up to $2 \times 10^9$ times were calculated to calculate the reduction ratio, the fatigue strength at $2 \times 10^6$ cycles calculated through the joint fatigue test was multiplied by the reduction ratio, and the joint fatigue strength (estimated value) under the gigacycle was evaluated. The results together with the welding condition are shown in Tables 4 and 5.

TABLE 1

(mass %)

| Type of Steel | C | Si | Mn | Ni | Cu | Cr | Ti | Al | Nb | V | Mo | P | B | S |
|---|---|---|---|---|---|---|---|---|---|---|---|---|---|---|
| Steel 1 | 0.04 | 0.12 | 1.8 | 0.3 | 0.3 | | 0.01 | 0.003 | | | | 0.005 | | 0.002 |
| Steel 2 | 0.02 | 0.11 | 2.2 | 0.5 | 0.5 | 0.2 | 0.01 | 0.002 | | | 0.1 | 0.004 | | 0.002 |
| Steel 3 | 0.08 | 0.22 | 1.5 | | | 0.5 | 0.01 | 0.003 | | | | 0.007 | | 0.002 |
| Steel 4 | 0.05 | 0.05 | 2.5 | | | | 0.03 | 0.002 | | | | 0.005 | | 0.002 |
| Steel 5 | 0.05 | 0.06 | 1.8 | 0.1 | 0.1 | | 0.02 | 0.004 | 0.01 | | | 0.005 | 0.0005 | 0.003 |
| Steel 6 | 0.05 | 0.08 | 1.6 | 0.5 | 0.4 | | 0.03 | 0.006 | | 0.02 | 0.1 | 0.004 | 0.001 | 0.002 |
| Steel 7 | 0.012 | 0.76 | 1.2 | 5.8 | 0.9 | | 0.005 | 0.002 | | | | 0.002 | | 0.001 |
| Steel 8 | 0.01 | 0.3 | 0.8 | | 0.01 | 0.9 | 0.02 | 0.06 | 0.08 | 0.1 | | 0.002 | 0.005 | 0.003 |
| Steel 9 | 0.05 | 0.06 | 1.8 | 0.1 | 0.1 | | 0.02 | 0.004 | 0.01 | 0.01 | 0.5 | 0.005 | 0.0005 | 0.003 |

TABLE 2

(mass %)

| | Ni | Cr | Mo | Fe |
|---|---|---|---|---|
| Foil 1 | 100 | | | — |
| Foil 2 | 50 | 50 | | — |
| Foil 3 | 20 | 30 | 1 | 49 |

TABLE 3

| Method | Condition No. | Acceleration Voltage | Beam Current | Welding Speed | Degree of Vacuum |
|---|---|---|---|---|---|
| Electron Beam | W1 | 150 kV | 180 mA | 25 cm/min | 7 Pa |
| | W2 | 150 kV | 180 mA | 21 cm/min | 0.07 Pa |
| | W3 | 150 kV | 170 mA | 15 cm/min | 0.07 Pa |
| | W4 | 150 kV | 150 mA | 10 cm/min | 7 Pa |
| | W5 | 150 kV | 180 mA | 10 cm/min | 0.07 Pa |
| | W6 | 150 kV | 155 mA | 10 cm/min | 0.07 Pa |
| | W7 | 150 kV | 180 mA | 30 cm/min | 7 Pa |

| Method | Condition No. | Output | Medium | Welding Speed | Atmosphere |
|---|---|---|---|---|---|
| Laser Welding | W8 | 15 kV | YAG | 90 cm/min | Argon |

TABLE 4

| | Steel Material | | Welding Conditions | | | | Chemical Composition of Welding Metal (mass %) | | | | | | | |
|---|---|---|---|---|---|---|---|---|---|---|---|---|---|---|
| Joint No. | Type of Steel | Plate Thickness | Welding Condition | Insertion of Foil | Type of Insert Foil | Thickness of Foil (mm) | Width of Melting Portion (mm) | C | Si | Mn | Ni | Cr | Mo | Cu | Total Amount of Ni, Cr, Mo, and Cu |
| Joint 1 | Steel 1 | 50 | W1 | Yes | Foil 1 | 0.2 | 4.5 | 0.04 | 0.12 | 1.8 | 4.7 | 0.0 | 0.0 | 0.3 | 5.0 |
| Joint 2 | Steel 1 | 50 | W1 | No | — | 0 | 3.6 | 0.04 | 0.12 | 1.8 | 0.3 | 0.0 | 0.0 | 0.3 | 0.6 |
| Joint 3 | Steel 1 | 50 | W2 | Yes | Foil 1 | 0.2 | 4.1 | 0.04 | 0.12 | 1.8 | 5.2 | 0.0 | 0.0 | 0.3 | 5.5 |
| Joint 4 | Steel 1 | 50 | W2 | Yes | Foil 2 | 0.3 | 4.3 | 0.04 | 0.12 | 1.8 | 3.8 | 3.5 | 0.0 | 0.3 | 7.6 |
| Joint 5 | Steel 1 | 80 | W3 | Yes | Foil 2 | 0.2 | 3.8 | 0.04 | 0.12 | 1.8 | 2.9 | 2.6 | 0.0 | 0.3 | 5.9 |
| Joint 6 | Steel 1 | 80 | W3 | No | — | 0 | 4.8 | 0.04 | 0.12 | 1.8 | 0.3 | 0.0 | 0.0 | 0.3 | 0.6 |
| Joint 7 | Steel 1 | 120 | W4 | Yes | Foil 2 | 0.3 | 5.5 | 0.04 | 0.12 | 1.8 | 3.0 | 2.7 | 0.0 | 0.3 | 6.1 |
| Joint 8 | Steel 1 | 120 | W4 | No | — | 0 | 6.2 | 0.04 | 0.12 | 1.8 | 0.3 | 0.0 | 0.0 | 0.3 | 0.6 |
| Joint 9 | Steel 2 | 80 | W5 | Yes | Foil 2 | 0.2 | 5.4 | 0.02 | 0.11 | 2.2 | 2.4 | 2.1 | 0.1 | 0.5 | 5.0 |
| Joint 10 | Steel 2 | 80 | W5 | No | — | 0 | 5.4 | 0.02 | 0.11 | 2.2 | 0.5 | 0.2 | 0.1 | 0.5 | 1.3 |
| Joint 11 | Steel 3 | 100 | W6 | Yes | Foil 3 | 0.4 | 7.2 | 0.08 | 0.22 | 1.5 | 2.8 | 3.3 | 0.0 | 0.0 | 6.1 |
| Joint 12 | Steel 3 | 100 | W6 | No | — | 0 | 7.2 | 0.08 | 0.22 | 1.5 | 0.0 | 0.5 | 0.0 | 0.0 | 0.5 |
| Joint 13 | Steel 4 | 60 | W2 | Yes | Foil 1 | 0.25 | 3.8 | 0.05 | 0.05 | 2.5 | 6.6 | 0.0 | 0.0 | 0.0 | 6.6 |
| Joint 14 | Steel 5 | 60 | W2 | Yes | Foil 1 | 0.3 | 3.9 | 0.05 | 0.06 | 1.8 | 7.8 | 0.0 | 0.0 | 0.1 | 7.9 |
| Joint 15 | Steel 6 | 60 | W2 | Yes | Foil 1 | 0.2 | 3.8 | 0.05 | 0.08 | 1.6 | 5.8 | 0.0 | 0.1 | 0.4 | 6.3 |
| Joint 16 | Steel 7 | 60 | W2 | No | — | 0 | 3.6 | 0.01 | 0.76 | 1.2 | 5.8 | 0.0 | 0.0 | 0.9 | 6.7 |
| Joint 17 | Steel 8 | 60 | W2 | Yes | Foil 1 | 0.2 | 3.8 | 0.01 | 0.30 | 0.8 | 5.3 | 0.9 | 0.0 | 0.0 | 6.2 |
| Joint 18 | Steel 9 | 60 | W2 | Yes | Foil 1 | 0.2 | 3.9 | 0.05 | 0.06 | 1.8 | 5.2 | 0.0 | 0.5 | 0.1 | 5.8 |
| Joint 19 | Steel 1 | 30 | W7 | Yes | Foil 1 | 0.2 | 3.1 | 0.04 | 0.12 | 1.8 | 6.8 | 0.0 | 0.0 | 0.3 | 7.1 |
| Joint 20 | Steel 1 | 15 | W8 | Yes | Foil 1 | 0.2 | 3.1 | 0.04 | 0.12 | 1.8 | 6.8 | 0.0 | 0.0 | 0.3 | 7.1 |

TABLE 5

| Joint No. | Transformation Starting Temperature Ms (° C.) (*5) | DI Value (*6) | Residual Stress Measurement Value of Welding End Portion (MPa) (*1) | Yield Strength of Base Metal (MPa) | Fatigue Strength of Joint at $2 \times 10^6$ cycles (MPa) (*2) | Lowering Rate in Ultrasonic Fatigue Test (*3) | Fatigue Strength of Joint under Gigacycle (MPa) (*4) | Tensile Strength of Joint (MPa) | CTOD Value under −10° C. (mm) |
|---|---|---|---|---|---|---|---|---|---|
| Joint 1 | 226 | 0.34 | −120 | 415 | 330 | 0.95 | 314 | 427 | 0.45 |
| Joint 2 | 303 | 0.22 | 120 | 415 | 210 | 0.91 | 191 | 427 | 0.55 |
| Joint 3 | 219 | 0.35 | −230 | 415 | 320 | 0.93 | 298 | 427 | 0.38 |
| Joint 4 | 181 | 0.94 | −220 | 415 | 330 | 0.91 | 300 | 427 | 0.39 |
| Joint 5 | 211 | 0.77 | −220 | 383 | 325 | 0.87 | 283 | 394 | 0.37 |
| Joint 6 | 303 | 0.22 | 180 | 383 | 190 | 0.87 | 165 | 394 | 0.44 |
| Joint 7 | 208 | 0.79 | −310 | 364 | 310 | 0.89 | 276 | 375 | 0.24 |
| Joint 8 | 303 | 0.22 | 215 | 364 | 180 | 0.89 | 160 | 375 | 0.72 |
| Joint 9 | 225 | 0.60 | −230 | 390 | 310 | 0.83 | 257 | 402 | 0.45 |
| Joint 10 | 289 | 0.24 | 280 | 390 | 185 | 0.83 | 154 | 402 | 0.77 |
| Joint 11 | 195 | 1.08 | −170 | 425 | 300 | 0.88 | 264 | 438 | 0.42 |
| Joint 12 | 293 | 0.39 | 280 | 425 | 165 | 0.88 | 145 | 438 | 0.56 |
| Joint 13 | 178 | 0.46 | −120 | 355 | 290 | 0.91 | 264 | 366 | 0.35 |
| Joint 14 | 173 | 0.43 | −180 | 360 | 260 | 0.83 | 216 | 371 | 0.42 |
| Joint 15 | 207 | 0.44 | −185 | 355 | 270 | 0.79 | 213 | 366 | 0.32 |
| Joint 16 | 214 | 0.22 | −180 | 550 | 320 | 0.82 | 262 | 567 | 1.21 |
| Joint 17 | 234 | 0.22 | −200 | 320 | 250 | 0.81 | 203 | 330 | 0.5 |
| Joint 18 | 204 | 0.59 | −170 | 440 | 310 | 0.83 | 257 | 453 | 0.35 |
| Joint 19 | 191 | 0.39 | −145 | 415 | 345 | 0.91 | 314 | 427 | 0.67 |
| Joint 20 | 191 | 0.39 | −160 | 415 | 355 | 0.89 | 316 | 427 | 0.82 |

(*1): Measurement with cut method by the distortion gauge attached to the surface of the base metal at a position separated from the welding metal by 1 mm (−: tensile stress, +: compressive stress)
(*2): Fatigue strength at $10^6$ cycles of the joint stress test piece taken by a method shown in FIG. 3
(*3): Ratio between the fatigue strength at $2 \times 10^6$ cycles and at $2 \times 10^9$ cycles in the ultrasonic fatigue test piece taken from the position shown in FIG. 3
(*4): Value estimated by: (Joint fatigue strength at $2 \times 10^6$ cycles obtained with the joint fatigue test piece) × (Lowering rate in the ultrasonic fatigue test)
(*5): Value calculated by using the formula (a)
(*6): Value calculated by using the formula (b)

With respect to the performance of the welding joint, the fracture toughness value δc (mm) is a value which is calculated at a test temperature of −10° C. in a CTOD (Crack Tip Opening Displacement) test. The CTOD test is one of tests that evaluate fracture toughness of a structure where a defect is present, and in the present example, an average value of three welding joints was calculated.

A joint tensile strength (MPa) was a result obtained in a manner such that a test piece No. U1 of a steel ship regulation/ the same inspection procedure (material of K piece) of (goods) NK (Nippon Kaiji kyokai) was manufactured, and then was subjected to a joint tensile test, and shows fracture strength.

Referring to Tables 4 and 5, it has been found that the transformation starting temperature exceeds 250° C. in the joint No. 2, 6, 8, 10, and 12, therefore tensile residual stress is present in the welding portion of the welding metal 4, and a fatigue strength at $2 \times 10^6$ cycles and a joint fatigue strength under the gigacycle were significantly reduced. In contrast, in the joint No. 1, 3, 4, 5, 7, 9, 11, and 13 to 20, transformation of the welding portion was created at a temperature of 250° C. or less, and compressive residual stress was exerted, so that all of the fatigue strength at 2×10⁶ cycles exceeded 260 MPa, and all of the joint fatigue strength under the gigacycle exceeded 200 MPa. Accordingly, it was found that the joint fatigue strength in the gigacycle was not significantly reduced in the joint No. 1, 3, 4, 5, 7, 9, 11, and 13 to 20.

INDUSTRIAL APPLICABILITY

According to the invention, when a high-strength steel plate is welded using the high-energy density beam to be used as a welding structure, the welding structure may have the fatigue resistant properties in the vibration environment in the gigacycle range, and a welding joint having a sufficient high fracture toughness value δc may be formed, so the welding joint has high industrial applicability as a foundation member as a wind power generating tower at sea.

REFERENCE SYMBOL LIST 1 steel material
2 groove
3 insert metal
4 welding metal
5 compressive stress
6 welding portion
21 steel plate
22 welding bead
23 joint fatigue test piece
24 ultrasonic fatigue test piece

The invention claimed is:

1. A welding joint formed by a high energy density beam, the welding joint comprising:
   a pair of steel materials; and
   a welding metal that is located at a butt welding portion between the pair of steel materials,
   wherein the pair of steel materials have a C content in a range of 0.01 to 0.08 mass %,
   wherein the welding metal has a C content in a range of 0.01 to 0.08 mass %, a Si content in a range of 0.05 to 0.76 mass %, a Mn content in a range of 0.8 to 2.5 mass %, a Cu content in a range of 0.0 to 5.0 mass %, a Ni content in a range of 0.5 to 7.8 mass %, a Cr content in a range of 0.0 to 6.0 mass %, and a Mo content in a range of 0.0 to 2.0 mass %,
   wherein the amounts of C, Si, Mn, Cu, Ni, Cr and Mo in the welding metal further satisfy the following formula (a), $$Ms(°C.)=371-353C-22Si-24.3Mn-7.7Cu-17.3Ni-17.7Cr-25.8Mo, \quad (a)$$

wherein Ms represents a transformation starting temperature which is 250° C. or less, and wherein each of C, Si, Mn, Cu, Ni, Cr and Mo in formula (a) represents the composition in mass % in the welding metal, and
   wherein the welding metal has a microstructure which consists of martensite and the welding metal is in a state in which a compressive residual stress is imparted through the transformation of the welding metal during a welding into martensite.

2. The welding joint according to claim 1, wherein the welding metal contains 0.5 to 4.0 mass % Ni and 0.5 to 6.0 mass % Cr.

3. The welding joint according to claim 2, wherein the welding metal contains one or two of 0.1 to 2.0 mass % Mo and 0.1 to 5.0 mass % Cu, and contains Ni, Cr, Mo, and Cu by 1.1 to 10.0 mass % in total.

4. The welding joint according to claim 1, wherein the welding metal contains 4.0 to 6.0 mass % Ni.

5. The welding joint according to claim 4, wherein the welding metal contains one or two or more of 0.1 to 6.0 mass % Cr, 0.1 to 2.0 mass % Mo, and 0.1 to 5.0 mass % Cu, and contains Ni, Cr, Mo, and Cu by 4.1 to 10.0 mass % in total.

6. The welding joint according to claim 1, wherein the steel material contains 0.05 to 0.80 mass % Si, 0.8 to 2.5 mass % Mn, ≤0.03 mass % P, ≤0.02 mass % S, ≤0.008 mass % Al, 0.005 to 0.030 mass % Ti, and a balance consisting of iron and unavoidable impurities.

7. The welding joint according to claim 6, wherein the steel material contains one or two or more of 0.1 to 1.0 mass % Cu, 0.1 to 6.0 mass % Ni, 0.1 to 1.0 mass % Cr, 0.1 to 0.5 mass % Mo, 0.01 to 0.08 mass % Nb, 0.01 to 0.10 mass % V, and 0.0005 to 0.0050 mass % B.

8. The welding joint according to any one of claims 1 to 5, 6 and 7, wherein a thickness of the steel material is 30 mm to 200 mm.

9. The welding joint according to any one of claims 1 to 5, 6 and 7, wherein the high-energy density beam is an electron beam.

10. The welding joint according to claim 2, wherein the steel material contains 0.05 to 0.80 mass % Si, 0.8 to 2.5 mass % Mn, ≤0.03 mass % P, ≤0.02 mass % S, ≤0.008 mass % Al, 0.005 to 0.030 mass % Ti, and a balance consisting of iron and unavoidable impurities.

11. The welding joint according to claim 3, wherein the steel material contains 0.05 to 0.80 mass % Si, 0.8 to 2.5 mass % Mn, ≤0.03 mass % P, ≤0.02 mass % S, ≤0.008 mass % Al, 0.005 to 0.030 mass % Ti, and a balance consisting of iron and unavoidable impurities.

12. The welding joint according to claim 4, wherein the steel material contains 0.05 to 0.80 mass % Si, 0.8 to 2.5 mass % Mn, ≤0.03 mass % P, ≤0.02 mass % S, ≤0.008 mass % Al, 0.005 to 0.030 mass % Ti, and a balance consisting of iron and unavoidable impurities.

13. The welding joint according to claim 5, wherein the steel material contains 0.05 to 0.80 mass % Si, 0.8 to 2.5 mass % Mn, ≤0.03 mass % P, ≤0.02 mass % S, ≤0.008 mass % Al, 0.005 to 0.030 mass % Ti, and a balance consisting of iron and unavoidable impurities.

14. The welding joint according to claim 10, wherein the steel material contains one or two or more of 0.1 to 1.0 mass % Cu, 0.1 to 6.0 mass % Ni, 0.1 to 1.0 mass % Cr, 0.1 to 0.5 mass % Mo, 0.01 to 0.08 mass % Nb, 0.01 to 0.10 mass % V, and 0.0005 to 0.0050 mass % B.

15. The welding joint according to claim 11, wherein the steel material contains one or two or more of 0.1 to 1.0 mass % Cu, 0.1 to 6.0 mass % Ni, 0.1 to 1.0 mass % Cr, 0.1 to 0.5 mass % Mo, 0.01 to 0.08 mass % Nb, 0.01 to 0.10 mass % V, and 0.0005 to 0.0050 mass % B.

16. The welding joint according to claim 12, wherein the steel material contains one or two or more of 0.1 to 1.0 mass % Cu, 0.1 to 6.0 mass % Ni, 0.1 to 1.0 mass % Cr, 0.1 to 0.5 mass % Mo, 0.01 to 0.08 mass % Nb, 0.01 to 0.10 mass % V, and 0.0005 to 0.0050 mass % B.

17. The welding joint according to claim 13, wherein the steel material contains one or two or more of 0.1 to 1.0 mass % Cu, 0.1 to 6.0 mass % Ni, 0.1 to 1.0 mass % Cr, 0.1 to 0.5 mass % Mo, 0.01 to 0.08 mass % Nb, 0.01 to 0.10 mass % V, and 0.0005 to 0.0050 mass % B.

18. The welding joint according to claim 8, wherein the high-energy density beam is an electron beam.

19. The welding joint according to any one of claims 10 to 17, wherein a thickness of the steel material is 30 mm to 200 mm.

20. The welding joint according to any one of claims 10 to 17, wherein the high-energy density beam is an electron beam.

21. The welding joint according to claim 19, wherein the high-energy density beam is an electron beam.

* * * * *